United States Patent
Yuan et al.

(10) Patent No.: US 11,300,817 B2
(45) Date of Patent: Apr. 12, 2022

(54) REPAIRING DEVICE, REPAIRING METHOD OF DISPLAY PANEL

(71) Applicant: HKC CORPORATION LIMITED, Shenzhen (CN)

(72) Inventors: Haijiang Yuan, Shenzhen (CN); Jiaren Lin, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/181,081

(22) Filed: Feb. 22, 2021

(65) Prior Publication Data

US 2022/0035186 A1 Feb. 3, 2022

(30) Foreign Application Priority Data

Jul. 28, 2020 (CN) .......................... 202010742155.8

(51) Int. Cl.
*G02F 1/13* (2006.01)
(52) U.S. Cl.
CPC ................................ *G02F 1/1309* (2013.01)
(58) Field of Classification Search
CPC ................................................... G02F 1/1309
See application file for complete search history.

(56) References Cited

U.S. PATENT DOCUMENTS

2006/0050223 A1  3/2006 Umetsu

FOREIGN PATENT DOCUMENTS

| CN | 1837900 A | 9/2006 | |
|---|---|---|---|
| CN | 205900064 U | 1/2017 | |
| CN | 108519691 A | 9/2018 | |
| JP | 2007233313 A | 9/2007 | |
| KR | 20060102171 A | * 9/2006 | ........... G06T 7/0004 |

OTHER PUBLICATIONS

First Office Action issued in counterpart Chinese Patent Application No. 202010742155.8, dated Sep. 8, 2021.

* cited by examiner

*Primary Examiner* — Donald L Raleigh
(74) *Attorney, Agent, or Firm* — Westbridge IP LLC

(57) ABSTRACT

The present application discloses a repairing device of a display panel, including a chassis provided with a workbench, the workbench having an installation surface for installing the display panel; an image collector for collecting image of the display panel; a vibration member provided on the chassis; and a controller for controlling the vibration member to vibrate according to the image of the display panel collected by the image collector, thereby the vibration member vibrates at a defective position of the display panel on the workbench. The present application also provides a repairing method of a display panel.

18 Claims, 4 Drawing Sheets

REPAIRING DEVICE, REPAIRING METHOD OF DISPLAY PANEL

CROSS REFERENCE TO RELATED APPLICATIONS

The present application claims priority to Chinese patent application No. 202010742155.8, filed on Jul. 28, 2020 with the China National Intellectual Property Administration, entitled "Repairing Device, Repairing Method of Display Panel", the entirety content of which is incorporated herein by reference.

TECHNICAL FIELD

The present application relates to a mechanical automation technology field, particularly relates to a repairing device of a display panel and a repairing method of a display panel.

BACKGROUND

The manufacturing process of the display panel (LCD panel) includes manufacturing processes of the array substrate (array manufacturing process) and the color filter substrate (CF manufacturing process), and the alignment installation process of the array substrate and color filter substrate (Cell manufacturing process). During all those manufacturing processes, there may be particles falling into the display panel. If there are particles falling into the display panel, there are some defects such as white dots on the display panel when the display panel is lighted for detection. The display panel with such defects is considered to be a down grade product according to specification levels of display panels. Such defects only can be eradicated from the beginning of the manufacturing process. The repair can only be carried out to the array substrate or the color filter substrate of the display panel before the alignment installation process. The display panel with defects caused by the fallen particles during the alignment installation process of the array substrate and the color filter substrate cannot be repaired currently and can only be sold at a lower price.

SUMMARY

A main purpose of the present application is to provide a repairing device of a display panel, aiming at realizing a sequential arrangement of the liquid crystals in the display panel and an even display of the display panel when the display panel is lighted for detection.

In order to realize the above purpose, the present application provides a repairing device of a display panel, including:

a chassis provided with a workbench, and the workbench having an installation surface for installing the display panel;

an image collector for collecting an image of the display panel;

a vibration member provided on the chassis; and a controller for controlling the vibration member to vibrate according to the image of the display panel collected by the image collector, thereby the vibration member vibrates at a defective position of the display panel on the workbench.

In one embodiment, the controller controls the vibration member to vibrate at the defective position according to the defective position of the display panel which is determined according to the image.

In one embodiment, the installation surface is provided with a transmission member, which is for driving the display panel to move.

In one embodiment, the chassis comprises a support frame and a first installation frame, the workbench is provided on the support frame, the first installation frame is movably connected with the support frame, and the vibration member is provided on the first installation frame.

In one embodiment, the vibration member is movably provided on the first installation frame.

In one embodiment, the chassis further includes a second installation frame, which is movably connected with the support frame, the image collector is provided on the second installation frame.

In one embodiment, the image collector is movably provided on the second installation frame.

In one embodiment, the installation surface is provided with a buffer member.

In order to realize the above purpose, the present application also provides a repairing device of a display panel, including:

a chassis provided with a workbench, and the workbench having an installation surface for installing the display panel;

a backlight source provided on the workbench and for lighting the display panel;

an image collector for collecting an image of the display panel;

a vibration member provided on the chassis; and a controller for controlling the vibration member to vibrate according to the image of the display panel collected by the image collector, thereby the vibration member vibrates at a defective position of the display panel on the workbench.

Furthermore, the present application also provides a repairing method of a display panel, applied on the repairing device of the display panel as mentioned above, including the following steps:

obtaining the image of the display panel collected by the collector;

controlling the vibration member of the repairing device of the display panel to vibrate according to the image, so that the vibration member vibrates at a defective position of the display panel.

In one embodiment, the step "controlling the vibration member of the repairing device of the display panel to vibrate according to the image, thereby the vibration member vibrates at the defective position of the display panel" comprises:

obtaining the defective position of the display panel according to the image;

controlling the vibration member to vibrate at the defective position.

In one embodiment, the step "controlling the vibration member to vibrate at the defective position" comprises:

controlling a transmission member of the repairing device of the display panel to drive the display panel to move, thereby the defective position of the display panel is located below the vibration member; or, controlling a first installation frame and/or the vibration member on the repairing device of the display panel, thereby the vibration member moves to the defective position;

controlling the vibration member to vibrate.

The repairing device of the display panel of the present application collects an image of the display panel by an image collector, and determines defects of the display panel caused by the particles affecting an arrangement of the liquid crystals according to the collected image, thereby controlling the vibration member to vibrate the display panel, so that the liquid crystals avoid the influence of particles and to vibrate the display panel to repair the arrangement of the liquid crystals, so that all liquid crystals arrange in order to realize an even display of the display panel when the display panel is lighted for detection.

BRIEF DESCRIPTION OF THE DRAWINGS

For more clearly illustrate the technical solutions in the embodiments of the present application or the related art, the drawings required to use in the description of the embodiments or the related art will be simply introduced as below. Obviously, the drawings described as below are merely some embodiments of the present application. For one of ordinary skill in the art, other drawings can be obtained based on these drawings without creative work.

The realization of the purpose, functional characteristics, and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described in conjunction with the drawings in the embodiments of the present application as below. Obviously, the described embodiments are only a portion and not all of the embodiments of the present application. Based on the embodiments in the present application, all other embodiments obtained by one of ordinary skill in the art without creative work shall fall within the claimed scope of the present application.

It should be noted that if the embodiments of the present application relate to directional indications (such as up, down, left, right, front, back . . . ), the directional indications are only set to explain the relative position relationship, movement situation, etc. between components in a specific posture (as shown in the accompanying drawings). If the specific posture changes, the directional indication will change accordingly.

In addition, if the embodiments of the present application relate to the description of "first", "second", etc., the description of "first", "second", etc. are only set for descriptive purposes, and cannot be understood as indicating or implying their relative importance or implicitly indicating a number of indicated technical features. Therefore, the features defined with "first", "second" may explicitly or implicitly include at least one of the features. In addition, the technical solutions between the various embodiments can be combined with each other, but must be based on what can be achieved by one of ordinary skill in the art. When a combination of technical solutions is contradictory or cannot be achieved, it should be considered that such a combination of technical solutions does not exist, and is not within the protection scope required by the present application.

The present application provides a repairing device of a display panel, which is for repairing a display panel, particularly repairing white dots in the display panel caused by an irregular arrangement of liquid crystals resulted from existence of particles.

In order to solve the problem of an irregular sequence of the liquid crystals in the display panel caused by particles, the following embodiments are proposed.

Figure 1:
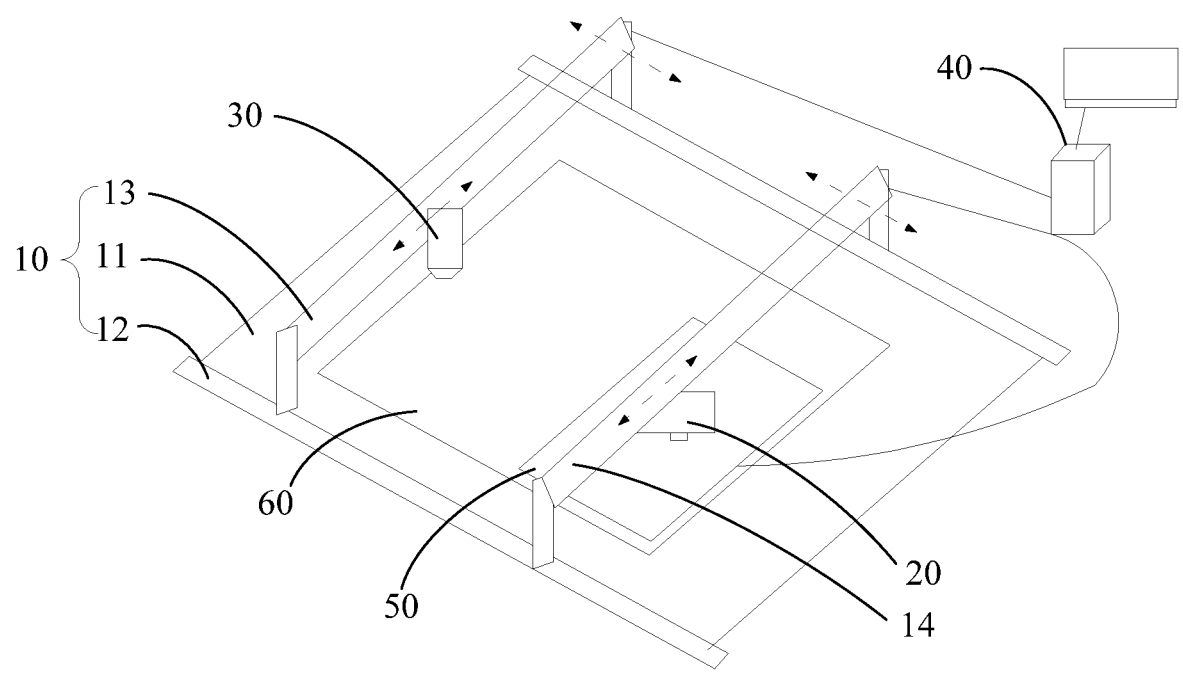
FIG. 1 is a structural schematic diagram of a working state of a repair device of display panel according to an embodiment of the present application.

In one embodiment, referring to FIG. 1, the repairing device of the display panel 50 includes: a chassis 10, an image collector 20, a vibration member 30 and a controller 40. The chassis 10 is provided with a workbench 11. The workbench 11 has an installation surface. The installation surface is for receiving the display panel 50 to be tested. The controller 40 is connected with the image collector 20 and the vibration member 30. The controller 40 controls the collector 20 to detect defects of the display panel 50. The controller 40 controls the vibration member 30 to vibrate the display panel 50 for restoring an arrangement of liquid crystals in the display panel 50, thereby avoiding existence of white dots in the display panel 50. Further, the controller 40 controls the vibration member 30 to vibrate at a defective position of the display panel 50. By directly vibrating the defective position, improving a vibration frequency at the defective position, a repair speed and a repair effect of the display panel 50 is improved.

In one embodiment, the installation surface is arranged horizontally, so that the display panel 50 can be directly placed on the installation surface. Or in order to prevent the display panel 50 from shifting during the vibration process and affect the repair effect, a positioning member (not shown in the figure) is provided on the workbench 11. The positioning member is used to fix the display panel 50 after the display panel 50 is placed on the installation surface. The positioning member may be a buckle member, and the buckle member can buckle the display panel after the display panel 50 is placed on the installation surface. Or, the positioning member can also be a plurality of elastic bosses provided on the installation surface, which enclose to form a positioning frame for the display panel 50. The display panel 50 is stuck into the positioning frame for positioning. It can be understood that the structure of the positioning member includes but is not limited to the above two types. After the display panel 50 is installed on the workbench 11, any structure capable of positioning the display panel 50 is within the protection scope of this embodiment.

Figure 3:
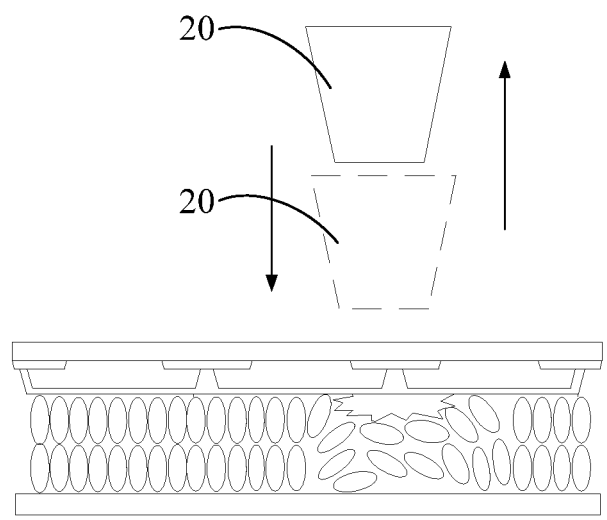
FIG. 3 is a structural schematic diagram of a cross-section of display panel before being repaired by the repairing device of the display panel according to an embodiment of the present application.
Figure 4:
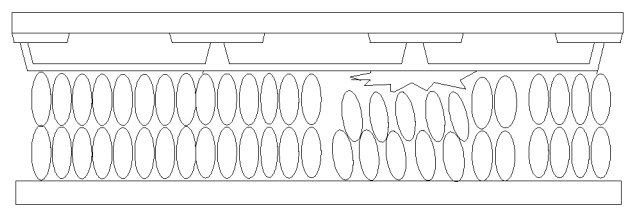
FIG. 4 is a structural schematic diagram of a cross-section of the display panel after being repaired by the repairing device of the display panel according to an embodiment of the present application.

The repairing device of the display panel 50 of this embodiment is mainly used to repair the display effect of the display panel 50, specifically to repair the display problem of white dots caused by the particles existed in the display panel 50 affecting a neat sequence of the liquid crystals. The repair effect refers to FIGS. 3 and 4, FIG. 3 is a sequence schematic diagram of the liquid crystals of the display panel 50 before repairing, and FIG. 4 is a sequence schematic diagram of the liquid crystals of the display panel 50 after repairing. Before repairing the display panel 50, the liquid crystals are obstructed by particles, which affects their sequences and deflection angles. After the display panel 50 is lighted, light is directly emitted out when passing through a position where the liquid crystals are irregularly sequenced, resulting in white dots appearing on the display panel 50. After the display panel 50 is vibrated, a height of the particles becomes lower under the vibration of the vibrating member 30, so that the liquid crystal molecules that were originally irregularly sequenced on where there exist particles restore the neat sequence. After being powered, the angle of the liquid crystals is deflected for a neat sequence. In such way, when the light reaches the liquid crystals, the original defect of white dots appearing on the display panel after the display panel 50 is lighted disappears, and the display panel 50 displays homogeneously, thereby improving the product yield.

In one embodiment, the vibration member 30 is fixed on the chassis 10. The display panel 50 is driven to move, such that the defective position of the display panel 50 is moved to correspond to the vibration member 30. The vibration member 30 vibrates at the defective position of the display panel 50 when the controller 40 controls the vibration member 30 to vibrate.

The installation surface is provided with a transmission member (not shown in the figures), the transmission member is for driving the display panel 50 to move, such that the defective position of the display panel 50 is moved to beneath the vibration member 30. When the defective position of the display panel 50 is moved to beneath the vibration member 30, the controller 40 controls the vibration member 30 to vibrate, such that the vibration member 30 vibrates at the defective position.

Specifically, the transmission member includes a conveyor belt or roller that transmits along a X axis, and a push rod of a cylinder that moves along a Y axis. The cylinder is fixed on the chassis and locates at an edge of the installation surface. The push rod of the cylinder extends toward the Y axis of the installation surface. The controller 40 controls conveyor belt or roller to drive the display panel 50 to move along the X axis. The controller 40 also controls the push rod of the cylinder to work to drive the display panel 50 to move along the Y axis. It can be understood that, the chassis 10 is provided with at least two push rods. The push rods locate on two opposite sides of the installation surface, the controller 40 controls a corresponding push rod to work according to positions needed to be adjusted.

Figure 2:
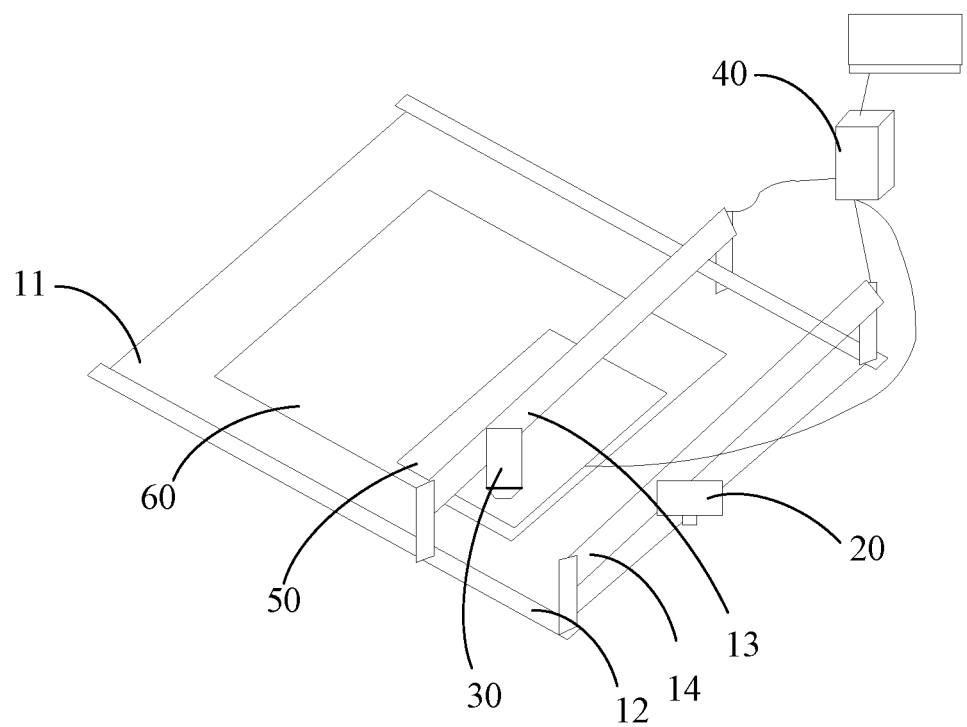
FIG. 2 is a structural schematic diagram of another working state of the repair device of display panel according to an embodiment of the present application.

Or, in one embodiment, referring to FIG. 2, the vibration member 30 can be movably provided with respect to the chassis 10. The controller 40 controls the vibration member 30 to vibrate after controlling the vibration member 30 to move to the defective position of the display panel 50, such that the vibration member 30 vibrates at the defective position of the display panel 50. In this embodiment, the vibration member 30 vibrating at the defective position of the display panel 50 can be understood to be that a vibration position of the vibration member 30 and the defective position are located on a straight line, or that the vibration position of the vibration member 30 is directly opposite to the defective position.

For example, the vibration member 30 vibrates at a position that is on a same straight line as the defective position. The frame 10 can be set to include a support frame 12 and a first installation frame 13, The workbench 11 is set on the support frame 12. The first installation frame 13 is movably connected with the support frame 12, and the vibration member 30 is amounted on the first installation frame 13. The support frame 12 is placed on the ground. One side of the support frame 12 facing away from the ground is provided with the workbench 11.

The first installation frame 13 moves along the X axis of the support frame 12. The controller 40 controls the first installation frame 13 to move along the X axis, so that vibration member 30 provided on the first installation frame 13 moves to be on a same straight line as the defective position of the display panel 50, and controls the vibrating member 30 to vibrate at this position.

In one embodiment, in order to realize that the vibration position of the vibration member 30 is directly opposite to the defective position, based on the above embodiment, the vibration member 30 can be movably provided on the first installation frame 13. The vibration member 30 is movable relative to the first installation frame 13 and the first installation frame 13 is movable relative to the support frame 12, thereby realizing that the vibration member 30 is controlled to move to a plurality of positions. Specifically, the first installation frame 13 extends along the Y axis of the support frame 12, the vibration member 30 moves along an extension direction of the support frame 12. The position of the vibration member 30 at the X axis is adjusted by controlling the first installation frame 13 to move along the support frame 12. The position of the vibration member 30 at the Y axis is adjusted by controlling the vibration member 30 to move on the first installation frame 13. Such that, it realizes that the vibration member 30 moves to the defective position of the display panel, and vibrates over the defective position.

It can be understood that the repairing device of the display panel further includes a first driving member and a second driving member, the first driving member is for driving the first installation frame 13 to move along the support frame 12, and the second driving member is for driving the vibration member 30 to move along the first installation frame 13. The first driving member and the second driving member are both connected with the controller 40.

Further, the vibration member 30 includes a connection part and a vibration part. The connection part is connected with the chassis 10, and the vibration part is movably connected with the connection part, and vibrates between a first position and a second position, so that the vibration part abuts on the workbench on the display panel 50 when at the second position.

The vibration member 30 can be a vibration air gun, in which an air cavity is provided, and an air rod is provided in the air cavity. The air rod moves between the first position and the second position under an action of the gas in the air cavity. Or, the vibration member 30 can be a vibration rod, which is connected with a driving motor. The driving motor drives the vibration rod to move between the first position and the second position. In this embodiment, the vibration member 30 is a high frequency vibration gun, which vibrates the particles in the display panel 50 at a high frequency to increase the probability of the particles separating from the liquid crystals, thereby improving the repair effect of the display panel 50. The vibration frequency of the vibration member can be fixed, or it can be set according to different products and different users' requirements.

It can be understood that the image collector 20 can be provided on the chassis 10 or other devices. The image collector 20 is for collect an image of the display panel 50 on the workbench 11. The image collector 20 can directly collect an overall image of the display panel 50, or collect images of different regions of the display panel 50. When the image collector 20 collects images of different regions of the display panel 50, a number of cameras can be provided to collect images of the different regions; or the image collector 20 can be moved to positions corresponding to each region to obtain an image of each region.

Specifically, the chassis 10 further includes a second installation frame 14, which is movably connected with the support frame 12. The image collector 20 is installed on the second installation frame 14. When moving along the support frame 12, the second installation frame 14 drives the image collector 20 to move among the different regions of the display panel 50 on the workbench 11 for collecting the image of each region.

In one embodiment, the image collector 20 is movably provided on the second installation frame 14. The image collector 20 is movable relative to the second installation frame 14, and the second installation frame 14 is movable relative to the support frame 12, thereby realizing that the image collector 20 is controlled to move to a plurality of positions for collecting image.

It can be understood that the repairing device of the display panel further includes a third driving member and a fourth driving member. The third driving member is for driving the second installation frame 14 to move along the support frame 12, and the fourth driving member is for driving the image collector 30 to move along the second installation frame 14. The third driving member and the fourth driving member are both connected with the controller 40.

In one embodiment of the present application, the repairing device of the display panel 50 collects an image of the display panel 50 by an image collector 20, and determines defects of the display panel 50 caused by the particles affecting an arrangement of the liquid crystals according to the collected image, thereby controlling the vibration member 30 to vibrate the display panel 50, so that the liquid crystals avoid the influence of particles and to vibrate the display panel to repair the arrangement of the liquid crystals, so that all liquid crystals arrange in order to realize an even display of the display panel 50 when the display panel 50 is lighted for detection.

In this embodiment, based on that the particles mainly affect the sequence of the liquid crystals, after the display panel is assembled, the sequence and deflection angles of the liquid crystals cannot be detected. The sequence and deflection angles of the liquid crystals can only be determined according to a display status of the display panel 50, thus when the repairing device of this embodiment detects the display device 50, it needs to emit light to the display panel 50. Specifically, a backlight source 60 of the display panel 50 can be directly turned on to emit light to the display panel 50. Or in another embodiment, the repairing device of the display panel 50 further includes a backlight source 60, which is provided on the workbench 11. The backlight source 60 is for emit light to the display panel 50. The specific detection process is that: the display panel 50 to be detected is provided on the installation surface, the backlight source 60 locates beneath the display panel 50, the backlight source 60 is turned on to emit light to the display panel 50, the image collector 20 is controlled to collect image of the display panel 50 and the vibration element 30 is controlled to vibrate the defective position of the display panel 50 to repair the display effect of the display panel 50 according to the image.

In another embodiment, for the protection of the display panel 50 from being shattered when the display panel 50 is vibrated at a high frequency, a buffer member is provided on the installation surface. The display panel 50 is provided on the buffer member on the installation surface. When the display panel 50 is vibrated by the vibration member 30, the display panel 50 is buffered by the buffer member to reduce the vibration force from the vibration member 30. The buffer member can be a plastic part, or a sponge, etc.

It should be noted that the image collector 20 described in all the above embodiments is an optical image collector. The image collector 20 may be a camera, such as a CCD camera. The image collector 20 is connected with the controller 40. After collecting the image, the image collector transmits the image to the controller 40. The image collector 20 and the controller 40 can be connected through a wired or wireless connection, such as WiFi or Bluetooth.

The controller 40 includes an automatic optical detection program. After collecting the image of the display panel 50, the image collector 20 sends the image to the controller 40. The controller 40 runs the automatic optical detection program to processes the image to detect whether there are defects in the display panel 50. The detection methods for defects include but are not limited to the follows: the controller 40 obtains a gray scale value of each position of a collected image, determines gray scale differences according to obtained gray scale values, and determines the defects according to the gray scale differences, and further determines the defects by combining the gray scale differences and the defect shapes to realize the defect detection of the display panel 50.

Further, the controller 40 further includes a coordinate positioning program. After the display panel 50 is detected to be defective by the automatic optical detection program, the controller 40 runs the coordinate positioning program to calculate coordinates of the defective position of the display panel 50, and then controls the transmission member or the driving member of the first installation frame 13 to work according to the coordinates of the defective position to drive the display panel 50 or the vibration member 30 to move.

In this embodiment, the defective position of the display panel 50 is calculated according to the defective position reflected in the image. The coordinate origin is set in the coordinate positioning program in advance, for example, the coordinate origin is one of the corners of the display panel 50, and the X axis and the Y axis are two adjacent sides of the display panel 50 respectively. If a collection range of the image collector of the repairing device of the display panel covers the entire display panel 50, the coordinates of the defective position of the display panel 50 are: (X1; Y1), where X1 is a distance from the defective position to the Y axis, and the Y1 is a distance from the defective position to the X axis. If the collection range of the image collector 20 on the repairing device of the display panel covers partial region of the display panel 50, image of a plurality of regions are spliced to form an image of the entire display panel 50, and then the defective position of the display panel 50 is calculated by the spliced image. The calculation method can refer to the above described method, and will not be repeated here.

Furthermore, after calculating the coordinates of the defective position of the display panel 50 according to the image, the controller 40 controls the transmission member to move according to the coordinates, or controls the first installation frame 13 and/or the vibration member 30 to move.

The repairing device of the display panel 50 of this embodiment can determine the defective position of abnormity through the automatic optical detection program, calculate the coordinates of the defective position through the coordinate positioning program, and control the transmission member or the first installation frame 13 and/or the vibration member 30 to move according to the coordinates of the defective position, to locate the vibration member 30 at the defective position, and then control the vibration member 30 to vibrate to repair the defective position, which can completely eliminate the need for human intervention, that is, it completely automatically repairs the defect. In addition, due to the automatic repair, a vibration frequency and a vibration pressure on the display panel 50 can be standardized, which can reduce the inconsistencies of repair qualities of display panels 50 caused by human manual operation, so that the stable repair improves a success rate of repair.

Figure 5:
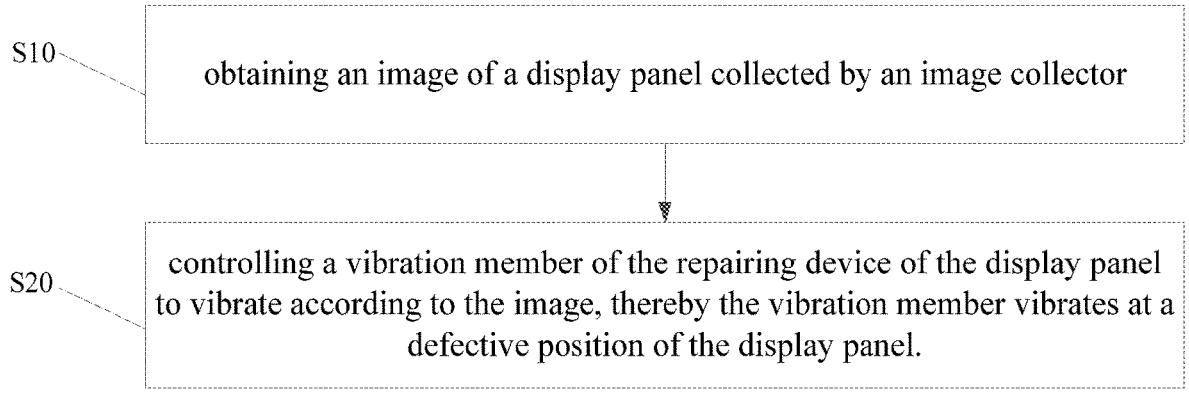
FIG. 5 is a flowchart schematic diagram of an embodiment of a repairing method of a display panel provided by the present application.

Referring to FIG. 5, the present application further provides an embodiment of a repairing method of a display panel, applied to the above-mentioned repairing device of the display panel, specifically, the repairing method of the display panel includes the following steps:

Step S10, obtaining an image of a display panel collected by an image collector.

Step S20, controlling a vibration member of the repairing device of the display panel to vibrate according to the image, thereby the vibration member vibrates at a defective position of the display panel.

This embodiment is applied to the above-mentioned repairing device of the display panel, and the repairing device is provided with an image collector and a vibration member. After obtaining image of the display panel by the image collector, a controller of the repairing device detects defects of the display panel through the image, and then controls the vibration member to vibrate. When the vibration member vibrates at the defective position of the display panel, the vibration member drives the display panel to vibrate, so that particles in the display panel are separated from the liquid crystals, and the liquid crystals can restore their neat arrangement to repair the display effect of the display panel.

Specifically, the step "controlling a vibration member of the repairing device of the display panel to vibrate according to the image" includes:

determining that there exists a defect in the display panel according to the image, controlling the vibration member of the repairing device of the display panel to vibrate;

determining that there exists no defect in the display panel according to the image, and outputting a prompt message prompting that the display panel is qualified and there is no defect.

The determination method of determining whether there exists a defect is same as the detection method of the above-mentioned repairing device of the display panel. That is, after the controller receives the image collected by the image controller, the image is processed by an automatic optical detection program to determine whether there exists a defect in the display panel. The detection method of defects includes but is not limited to the follows: the controller obtains a gray scale value of each position of the collected image, gray scale differences are determined according to obtained gray scale values, and determines the defects according to the gray scale differences, and further determines the defects by combining the gray scale differences and the defect shapes to realize the defect detection of the display panel.

If determining that there exist defects on the display panel according to the image, the controller controls the vibration member of the repairing device of the display panel to repair the defects. If determining that there exists no defect in the display panel according to the image, the controller outputs a prompt message, prompting that the display panel is qualified and there is no defect, so that to proceed the display panel to a next process, or proceed to detect a next display panel.

This embodiment collects an image of display panel by an image collector, and determines defects of the display panel caused by particles affecting an arrangement of liquid crystals according to the collected image, thereby controlling the vibration member to vibrate the display panel, so that the liquid crystals avoid the influence of particles and to vibrate the display panel to repair the arrangement of the liquid crystals, so that all liquid crystals arrange in order to realize an even display of the display panel when the display panel is lighted for detection.

Figure 6:
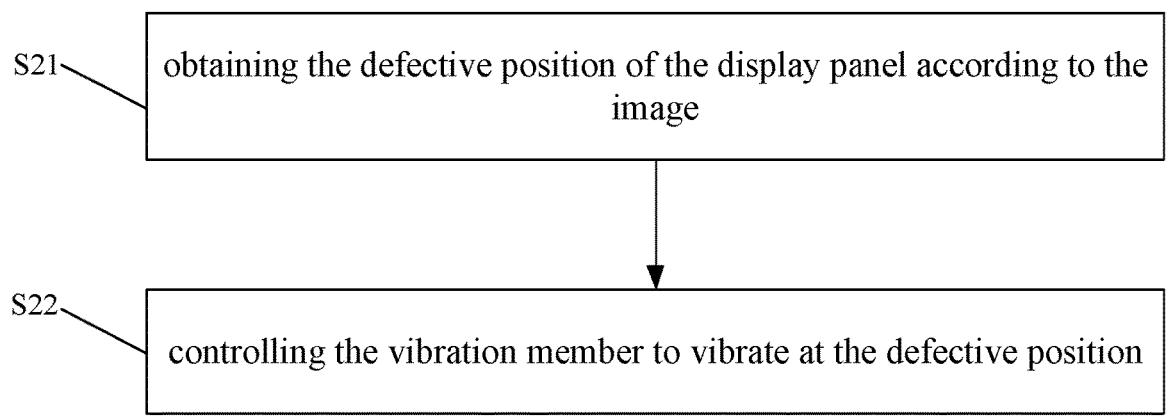
FIG. 6 is a detailed flowchart schematic diagram of step S20 in another embodiment of the repairing method of the display panel provided by the present application.

Referring to FIG. 6, the present application further provides another embodiment of the repairing method of the display panel, this embodiment is based on the above embodiment of FIG. 5, specifically the step "controlling a vibration member of the repairing device of the display panel to vibrate according to the image, so that the vibration member vibrates at a defective position of the display panel" includes:

Step S21, obtaining the defective position of the display panel according to the image.

Step S22, controlling the vibration member to vibrate at the defective position.

In this embodiment, the image collector collects an image of each position of the display panel. The controller determines the defective position of the display panel according to the image of each position, thereby controlling the vibration member to move to the defective position and vibrate, such that the vibration member vibrates at the defective position of the display panel.

That is, in this embodiment, the vibration vibrates at the defective position of the display panel, by directly vibrating the defective position, it improves the vibration frequency at the defective position and improves the repairing speed and repairing effect of the display panel.

Specifically, in this embodiment, the determination method of the defective position of the display panel is the same as the positioning method of the defective position by the above-mentioned repairing device of the display panel. After the controller detects that there exist defects on the display panel based on the automatic optical detection program, the controller calculates the coordinates of the defective position of the display panel by using the coordinate positioning program. The calculation method specifically includes the following progress: the coordinate origin is set in the coordinate positioning program in advance, for example, the coordinate origin is one of the corners of the display panel, and the X axis and the Y axis are two adjacent sides of the display panel respectively. If the collection range of the image collector on the repairing device of the display panel is the entire display panel, the coordinates of the defective position of the display panel are: (X1; Y1), where X1 is a distance from the defective position to the Y axis, and the Y1 is a distance from the defective position to the X axis. If a collection range of the image collector of the repairing device of the display panel covers partial regions of the display panel, image of a plurality of regions are spliced to form an image of the entire display panel, and then the defective position of the display panel is calculated by the spliced image. The calculation method can refer to the above described method, and will not be repeated here.

After the defective position of the display panel based on the above-mentioned positioning method is determined, the vibration member is controlled to vibrate at the defective position, and specifically a method for controlling the vibration member to vibrate at the defective position varies as a structure of the repairing device of the display panel varies. For example, when a workbench of the repairing device of the display panel is provided with a transmission member, which can drive the display panel to move relative to the workbench, the step "controlling the vibration member to vibrate at the defective position" includes:

controlling the transmission member of the repairing device of the display panel to work to drive the display panel on the transmission member to move, so that the defective position of the display panel locates beneath the vibration member;

or, for example when the vibration member is set to movable relative to the workbench to realize that the vibration member vibrates at the defective position of the display panel, the step "controlling the vibration member to vibrate at the defective position" includes:

controlling the first installation frame and/or the vibration member of the repairing device of the display panel to move, so that the vibration member moves to the defective position; and controlling the vibration member to vibrate.

Specifically, after calculating the coordinates of the defective position of the display panel according to the image, the controller controls the transmission member to move according to the coordinates, or controls the first installation frame and/or the vibration member to move, so that the vibration member can move to the defective position.

This embodiment improves the repair effect by controlling the vibration member to vibrate at the defective position of the display panel.

The above descriptions are only optional embodiments of the present application, and do not limit the scope of the application. Under the inventive concept of the present application, the equivalent structure transformations made by using the description and drawings of the present application, or direct/indirect applications to other related technical fields are included in the scope of the present application.

What is claimed is:

1. A repairing device of a display panel, comprising:
   a chassis provided with a workbench, the workbench having an installation surface for installing a display panel;
   an image collector for collecting an image of the display panel;
   a vibration member provided on the chassis; and
   a controller for controlling the vibration member to vibrate in a region corresponding to the image of the display panel collected by the image collector, thereby the vibration member vibrates at a defective position of the display panel on the workbench, to repair the arrangement of the liquid crystals.

2. The repairing device according to claim 1, wherein the controller is for controlling the vibration member to vibrate at the defective position which is determined according to the image.

3. The repairing device according to claim 1, wherein the installation surface is provided with a transmission member for driving the display panel to move.

4. The repairing device according to claim 1, wherein the chassis comprises a support frame and a first installation frame, the workbench is provided on the support frame, the first installation frame is movably connected with the support frame, and the vibration member is provided on the first installation frame.

5. The repairing device according to claim 4, wherein the vibration member is movably provided on the first installation frame.

6. The repairing device according to claim 4, wherein the chassis further comprises a second installation frame movably connected with the support frame, the image collector is provided on the second installation frame.

7. The repairing device according to claim 6, wherein the image collector is movably provided on the second installation frame.

8. The repairing device according to claim 1, wherein the installation surface is provided with a buffer member.

9. The repairing device according to claim 3, wherein the transmission member comprises a conveyor belt or roller that transmits along a X axis, and a push rod of a cylinder that moves along a Y axis, and the controller controls a rotation of the conveyor belt or roller to drive the display panel to move along the X axis and controls the push rod of the cylinder to push the display panel to move along the Y axis.

10. The repairing device according to claim 9, wherein the cylinder is fixedly provided on the chassis and located at an edge of the installation surface, and the push rod of the cylinder extends toward the Y axis of the installation surface.

11. The repairing device according to claim 6, further comprising a first driving member and a second driving member, wherein the first driving member is for driving the first installation frame to move along the support frame, and the second driving member is for driving the vibration member to move along the first installation frame.

12. The repairing device according to claim 1, wherein the vibration member comprises a connection part and a vibration part, the connection part is connected with the chassis, and the vibration part is movably connected with the connection part, and the vibration part is vibrated between a first position and a second position, thereby the vibration part is abutted against the display panel on the workbench when at the second position.

13. The repairing device according to claim 12, wherein the vibration member is a vibration air gun, in which an air cavity is provided, and an air rod is provided in the air cavity, and the air rod moves between the first position and the second position under an action of gas in the air cavity.

14. A repairing device of a display panel, comprising:
   a chassis provided with a workbench, the workbench having an installation surface for installing the display panel;
   a backlight source provided on the workbench and for lighting the display panel;
   an image collector for collecting an image of the display panel;
   a vibration member provided on the chassis; and
   a controller for controlling the vibration member to vibrate in a region corresponding to the image of the display panel collected by the image collector, thereby the vibration member vibrates at a defective position of the display panel on the workbench, to repair the arrangement of the liquid crystals.

15. A repairing method of a display panel, applied to the repairing device of the display panel according to claim 1, comprising the following steps:
   obtaining the image of the display panel collected by the collector;
   controlling the vibration member of the repairing device of the display panel to vibrate in a region corresponding to the image, thereby the vibration member vibrates at the defective position of the display panel.

16. The repairing method according to claim 15, wherein the step "controlling the vibration member of the repairing device of the display panel to vibrate according to the image, thereby the vibration member vibrates at the defective position of the display panel" comprises:
  obtaining the defective position of the display panel according to the image; and
  controlling the vibration member to vibrate at the defective position.

17. The repairing method according to claim 16, wherein the step "controlling the vibration member to vibrate at the defective position" comprises:
  controlling a transmission member of the repairing device of the display panel to drive the display panel to move, thereby the defective position of the display panel is located below the vibration member; and
  controlling the vibration member to vibrate.

18. The repairing method according to claim 16, wherein the step "controlling the vibration member to vibrate at the defective position" comprises:
  controlling a first installation frame and/or the vibration member of the repairing device of the display panel to move, thereby the vibration member is moved to the defective position; and
  controlling the vibration member to vibrate.

\* \* \* \* \*